United States Patent [19]
Tokune et al.

[11] Patent Number: 5,975,270
[45] Date of Patent: Nov. 2, 1999

[54] CLUTCH DISK OF C/C COMPOSITE FOR A WET FRICTION CLUTCH, AND PROCESS FOR PRODUCING THE SAME

[75] Inventors: Toshio Tokune; Tetsuo Naraki; Eiichiro Kawahara; Mitsumasa Furumoto; Tsukasa Takahashi; Takao Nakagawa; Mihoko Yamashita, all of Saitama, Japan

[73] Assignee: Honda Giken Kogyo Kabushiki Kaisha, Tokyo, Japan

[21] Appl. No.: 09/048,952

[22] Filed: Mar. 26, 1998

[30] Foreign Application Priority Data

Mar. 26, 1997 [JP] Japan .................................. 9-074155

[51] Int. Cl.⁶ ..................................................... F16D 11/00
[52] U.S. Cl. ................................. 192/107 M; 428/317.9; 264/29.6
[58] Field of Search .............................. 192/107 M, 188, 192/70.14; 428/317.9, 290; 264/29.6; 156/148; 523/152, 153, 154, 155, 156, 157, 158

[56] References Cited

U.S. PATENT DOCUMENTS

| | | |
|---|---|---|
| 3,429,766 | 2/1969 | Stormfeltz .......................... 192/107 M |
| 5,242,746 | 9/1993 | Bommier et al. ................... 192/107 M |
| 5,609,707 | 3/1997 | Bazshushtari et al. ................. 156/148 |
| 5,643,663 | 7/1997 | Bommier et al. ..................... 428/317.9 |
| 5,744,075 | 4/1998 | Klett et al. ............................. 264/29.6 |

FOREIGN PATENT DOCUMENTS

| | | |
|---|---|---|
| 62-165037 | 7/1987 | Japan . |
| 2-80639 | 3/1990 | Japan . |
| 4-72791 | 11/1992 | Japan . |

*Primary Examiner*—Charles A Marmor
*Assistant Examiner*—Tisha D. Waddell
*Attorney, Agent, or Firm*—Lyon & Lyon LLP

[57] ABSTRACT

A clutch disk made of a C/C composite for a wet multi-plate clutch is comprised of a disk body, and a pair of friction layers integral with and on opposite sides of the disk body for sliding contact with clutch plates. A relationship of $V_2 > V_1$ is established between the porosity $V_1$ of the disk body and the porosity $V_2$ of the friction layer, and the porosity $V_2$ of the friction layer 4 is set in a range of $20\% \leq V_2 \leq 60\%$, which provides a clutch disk with sufficient strength and excellent sliding characteristics.

15 Claims, 2 Drawing Sheets

CLUTCH DISK OF C/C COMPOSITE FOR A WET FRICTION CLUTCH, AND PROCESS FOR PRODUCING THE SAME

The present invention relates to a clutch disk made of a carbon fiber-reinforced carbon composite material (hereinafter a C/C composite) for use in a wet friction clutch and to a process for producing the clutch disk.

There is a conventionally-known clutch disk of this type disclosed in Japanese Patent Application Laid-open No.62-165037. In that known clutch disk, the porosity V is substantially uniform over the entire disk, and for example, is set at 15%. The reason why the porosity V is set at a relatively low percentage is that the strength of the entire clutch disk including a spline portion is ensured.

However, at a low porosity V as described above, the number of pores is insufficient. For this reason, the translation from a fluid lubrication to a boundary lubrication through the pores is not performed smoothly and hence, a good dynamic friction characteristic cannot be provided. The insufficiency of the number of pores also causes a failure of cooling of a friction portion of the clutch disk by the lubricating oil and hence, the temperature of the friction portion increases excessively. This results in a problem that the clogging of the pores with an oil sludge is rapidly advanced to cause early deterioration of the durability of the clutch disk.

SUMMARY OF THE INVENTION

It is an object of the present invention to provide a clutch disk of the above-described type, wherein the strength of the entire disk can be easily ensured, and a sufficient number of pores can be provided in the friction portion.

To achieve the above object, according to the present invention, there is provided a clutch disk made of a C/C composite for use in a wet friction clutch, comprising a disk body, and a friction layer integral with the disk body for sliding contact with a clutch plate, a relationship of $V_2 > V_1$ being established between a porosity $V_1$ of the disk body and a porosity $V_2$ of the friction layer, the porosity $V_2$ of the friction layer being in a range of $20\% \leq V_2 \leq 60\%$.

If the clutch disk is configured as described above, the porosity $V_1$ of the disk body can be set in a lower range of $V_1 < 20\%$, thereby easily ensuring the strength of the entire clutch disk.

On the other hand, if the porosity $V_2$ of the friction layer is set at a high level as described above, a sufficient number of pores can be provided in the friction layer, whereby the translation of the fluid lubrication to the boundary lubrication through the pores can be performed smoothly to provide a good dynamic friction characteristic. The clutch disk is sufficiently cooled by the lubricating oil and hence, the durability of the clutch disk can be enhanced.

However, if the porosity $V_2$ is higher than 60%, a good initial value can be provided, but the strength of bonding between the carbon fiber and a matrix is lower, resulting in a degraded wear resistance and a remarkably deteriorated durability. On the other hand, if $V_2 < 20\%$, a problem similar to that described in respect to the prior art arises.

It is another object of the present invention to provide a producing process which is capable of mass-producing a clutch disk having a configuration as described above.

To achieve the above object, according to the present invention, there is provided a process for producing a clutch disk made of a C/C composite for a wet friction clutch, comprising a disk body, and a friction layer integral with the disk body for sliding contact with a clutch plate, the process comprising the steps of forming a preform using a first forming material for the disk body, the material including a group of carbon fibers and a powdery carbon precursor, forming an intermediate including a portion corresponding to the disk body and a portion corresponding to the friction layer, using the preform and a second forming material for the frictional layer, the material including a group of carbon fibers and a powdery carbon precursor and carbonizing the carbon precursor in the intermediate.

With the above process, it is possible to mass-produce a clutch disk having a configuration as described above.

DETAILED DESCRIPTION OF THE PREFERRED EMBODIMENT

Figure 1:
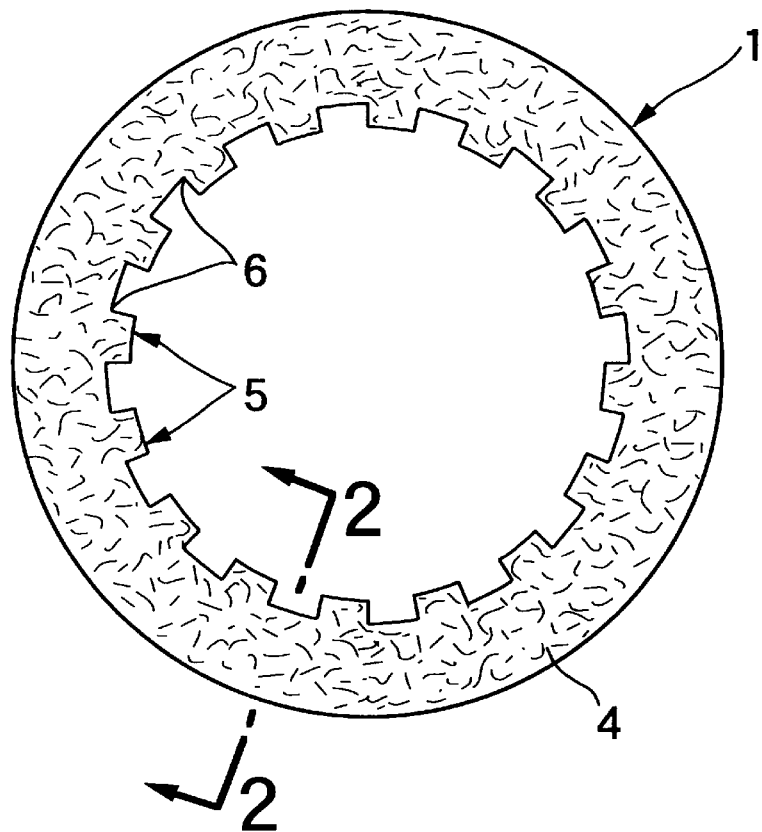
FIG. 1 is a front view of a clutch disk of the present invention.
Figure 2:
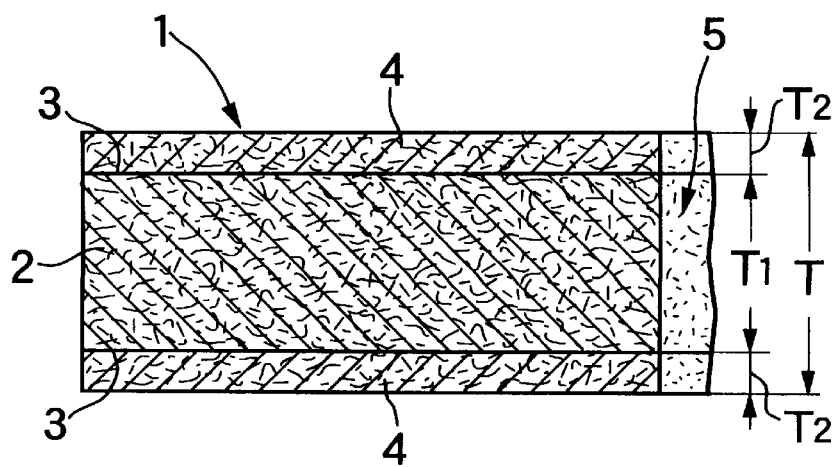
FIG. 2 is an enlarged sectional view taken along a line 2—2 in FIG. 1.

A clutch disk 1 shown in FIGS. 1 and 2 is formed of a C/C composite and used in a wet friction clutch, e.g., in a wet multi-plate clutch for an automotive transmission or the like. The clutch disk 1 is comprised of a disk body 2, and a pair of friction layers 4 which are integral with opposite annular end faces 3 of the disk body 2 and which are in sliding contact with a clutch plate. In this embodiment, the disk body 2 and each of the friction layers 4 have the same end face shape. A relationship of $V_2 > V_1$ is established between a porosity $V_1$ of the disk body 2 and a porosity $V_2$ of each of the friction layers 4, and the porosity $V_2$ of each of the friction layers 4 is set in a range of $20\% \leq V_2 \leq 60\%$.

If the clutch disk 1 is configured as described above, the porosity $V_1$ of the disk body 2 can be set in a lower range of $V_1 < 20\%$, thereby easily ensuring the strength of the entire clutch disk 1. However, if the porosity $V_1$ is equal to or higher than 20%, the strength of the disk body 2 is lowered and for this reason, there is a possibility that a tooth root 6 of a spline tooth 5 is fractured in the transmission of a torque. To avoid this, the thickness of the disk body 2 may be increased but this causes an increase in the size (axial length) of the multi-plate clutch, which is not preferred. On the other hand, a lower limit value of the porosity $V_1$ is set at 3% because it is difficult to produce a disk body 2 having a porosity lower than 3%.

On the other hand, if the porosity $V_2$ of each of the friction layers 4 is set at a higher value in a range of $20\% \leq V_2 \leq 60\%$, a sufficient number of pores can be provided in the friction layer 4, whereby the translation from the fluid lubrication to the boundary lubrication through the pores can be smoothly performed to provide a good dynamic friction characteristic. In addition, the clutch disk 1 is sufficiently cooled by the lubricating oil and hence, the durability of the clutch disk 1 can be enhanced.

In producing the clutch disk 1, a unique process which now will be described is employed. The process includes a step of forming a preform using a first forming material for the disk body 2, the material including a group of carbon fibers and a powdery carbon precursor, a step of forming an intermediate including a portion corresponding to the disk body 2 and a portion corresponding to the friction layers 4 using the preform and a second forming material for the friction layer 4, the second forming material including a group of carbon fibers and a powdery carbon precursor, a step of carbonizing the carbon precursor in the intermediate to provide a C/C composite product, and a step of subjecting the C/C composite product to machining. This machining produces the annular form of the clutch disk 1 and spline teeth 5. Alternatively, in the course of forming the intermediate, the latter may be formed into an annular shape and the spline teeth 5 may be formed.

The pores in the disk body 2 and the friction layer 4 are made by removal of a volatile component in the powdery carbon precursor. Therefore, the porosity $V_2$ of the friction layer 4 that includes a larger amount of the powdery carbon precursor is larger than the porosity $V_1$ of the disk body 2 ($V_2 > V_1$).

Any of pitch-type and PAN-type may be used as the carbon fiber in the first and second forming materials. A petroleum-type and/or a coal-type pitch powder may be used as the powdery carbon precursor. Further, both of the forming materials may include a petroleum-type coke and/or a coal-type coke as an aggregate.

Each of the forming materials is basically in the form of a preformed yarn as disclosed in Japanese Patent Application Laid-open No.2-80639 and Japanese Patent Publication No.4-72791. The term "preformed yarn" is defined as a yarn produced by coating a carbon fiber bundle including a pitch powder and a coke powder with a soft sleeve made of a thermoplastic synthetic resin.

The carbon fiber bundle which may be used is a fiber bundle by bundling about 500 to about 300,000 filaments of about 0.05 to about 600 deniers, preferably about 100 to about 48,000 filaments of about 10 to about 30 deniers. The wall thickness of the sleeve is in a range of about 5 to about 1,000 $\mu$m, preferably about 10 to about 30 $\mu$m, to provide a uniformity thereof and a flexibility of the preformed yarn. The diameter of the preformed yarn is in a range of about 0.1 mm to about 10 mm, preferably about 0.5 to about 5 mm.

The thermoplastic synthetic resin for forming the sleeve may be a thermoplastic synthetic resin which is completely molten at a forming temperature in a post-treatment, e.g., in a hot pressing. Examples of such resins are polymers such as polyamide, polyester, polyethylene, polypropylene, polystyrene, polyvinylidene fluoride, polyamideimide, polyimide, polyether imide, polyether sulfone, polyether ether ketone, polyphenylene sulfide and the like. For example, the polyamides which may be used are a homopolymer or a copolymer such as nylon 66, nylon 12, nylon 6/66/12 terpolymer. The polyesters which may be used are a homopolymer or a copolymer such as polyethylene terephthalate, polybutylene terephthalate, polyethylene-2,6-naphtalate, polyoxyethoxybenzoate, all aromatic polyesters.

A preformed sheet can be produced using a preformed yarn as described above. In producing the preformed sheet, a relatively thick preformed yarn and a relatively thin thermoplastic synthetic resin fiber yarn or a relatively thin carbon fiber bundle are woven with one used as a warp and the other used as a weft (see Japanese Patent Application Laid-open No.2-80639).

A fiber yarn made of a sleeve-forming resin of the above-described type is used as the thermoplastic synthetic resin fiber yarn. It is preferable that the thermoplastic synthetic resin fiber yarn is as thin as possible. For example, it is preferred that the thermoplastic synthetic resin fiber yarn have a diameter which is 1/5 or less of the diameter of the preformed yarn. Thus, it is possible to maintain the recti-linearity of the preformed yarn to avoid a reduction in strength of the C/C composite. Further, the weave proportion of the preformed yarn with the thermoplastic synthetic resin fiber yarn is usually set such that the content of the carbon fiber in the preformed sheet is in a range of about 3 to 70% by volume.

In the shaping of the intermediate, a hot pressing is applied. Conditions for the hot pressing are as follows, for example, the temperature is in a range of 400 to 600° C., and the pressure is in a range of 20 to 150 kgf/cm$^2$.

The intermediate is placed into a batch-type heating furnace, where it is subjected to the carbonizing treatment of the intermediate is carried out in an atmosphere of an inert gas such as nitrogen gas or in vacuum under conditions of a temperature in a range of 700 to 3,000° C. and a time of 1 to 300 hr. In a temperature range of 700 to 1,200° C., carbon is produced, and in a temperature range of 1,500 to 3,000° C., graphite is produced.

EXAMPLES OF C/C COMPOSITE CLUTCH DISKS

I. Sliding Characteristic of Friction Layer

A. Preparation of First Forming Material

Only one first forming material, which will be described below, was prepared to ensure a constant porosity $V_1$ of a plurality of disk bodies 2.

A preformed sheet was made in a weaving manner using a preformed yarn having a diameter of 3 mm as a warp and nylon 6 fiber yarn having a diameter of 0.05 mm as a weft. The preformed sheet was comprised of 98% by weight of the preformed yarn and 2% by weight of the nylon 6 fiber yarn.

The composition of the preformed yarn was as follows:

| | |
|---|---|
| Pitch powder | 30% by weight |
| Carbon fiber bundle | 48% by weight |
| Coke powder | 20% by weight |
| Sleeve | 2% by weight |

The pitch powder used is one which was produced from a petroleum pitch and comprised of 15% by weight of a volatile component and 85% by weight of a solid carbon and which had a softening point of 270° C. and an average particle size of 10 $\mu$m. The carbon fiber bundle used is one made by bundling 12,000 PAN-type filaments (T-300 made by Toray Industries, Inc.). The coke powder used is one made from a coal-type coke and having a volatile component content of 1% by weight and an average particle size of 10 $\mu$m. The sleeve used is one made of a polyamide (nylon 6) and having an outside diameter of 3 mm and a wall thickness of 20 $\mu$m.

B. Preparation of Second Forming Material

A plurality of second forming materials having different compositions shown in Table 1 were prepared to ensure that the porosity $V_2$ was varied in a plurality of friction layers 4. The second forming materials were made by shredding the preformed yarn in a lengthwise direction thereof into a basic length set at 1 inch (25.4 mm). The second forming material may include shredded pieces shorter in length than the basic length in order to enhance the fillability.

TABLE 1

| Second forming material | Forming constitute (% by weight) | | | |
|---|---|---|---|---|
| | Pitch powder | Carbon fiber bundle | Coke powder | Sleeve |
| Example 1 | 34 | 45 | 18 | 3 |
| Example 2 | 36 | 45 | 16 | 3 |
| Example 3 | 40 | 41 | 15 | 4 |
| Example 4 | 46 | 38 | 12 | 4 |
| Example 5 | 52 | 36 | 7 | 5 |
| Example 6 | 58 | 32 | 5 | 5 |
| Example 7 | 62 | 30 | 3 | 5 |

A forming procedure similar to that used in the preformed yarn for the first forming material was used as each of the forming procedures for the Examples shown in Table 1.

C. Production of Clutch Disk (1) The preformed sheet, which was the first forming material, was subjected to a cutting to fabricate a plurality of square plates. Then, eight of those square plates were superposed one on another and subjected to a hot pressing under conditions of a temperature of 500° C. and a pressure of 50 kgf/cm². This was repeated to provide a plurality of preforms.

(2) An example 1 of a second forming material was placed in a predetermine amount onto a shaping plate, and one of the eight square preforms was placed thereon. Further, a predetermined amount of the example 1 of the second forming material was placed on top of the preform. Thereafter, the resulting layers of materials were subjected to a hot pressing under conditions of a temperature of 480° C. and a pressure of 40 kgf/cm² to provide an example 1 of an intermediate.

Using the other six square preforms and examples 2 to 7 of the second forming material, examples 2 to 7 of intermediates were produced in the same manner as described above.

(3) The examples 1 to 7 of the intermediates were placed into a batch-type heating furnace, where they were subjected to a carbonizing treatment in a nitrogen gas atmosphere at a temperature of 2,000° C. for 30 hours, thereby providing examples 1 to 7 of C/C composites.

(4) The examples 1 to 7 of the C/C composites were subjected to a machining to provide examples 1 to 7 of clutch disks 1 having the shape shown in FIGS. 1 and 2. In the examples 1 to 7 of the clutch disks 1, the thickness T of the entire disk 1 was equal to 3 mm; the thickness $T_1$ of the disk body 2 was equal to 2 mm; and the thickness $T_2$ of each of the friction layers 4 was equal to 0.5 mm. Each of these thicknesses was determined by observing the section of the clutch disk 1 by an electronic microscope (SEM).

D. Estimation of Characteristic of Friction layer (1) Measurement of Porosity

A toluene process was utilized for the measurement of the porosity. First, the porosity V of the entire clutch disk 1 having the thickness T was measured. Then, each of the friction layers 4 having the thickness $T_2$ was scraped away from the clutch disk 1 and thereafter, the porosity $V_1$ of the disk body 2 having the thickness $T_1$ was measured. The porosity $V_2$ of the friction layer 4 was calculated according to the following equation:

$$V=(T_1/T)\cdot V_1+(2T_2/T)\cdot V_2$$

$$\therefore V_2=(T\cdot V-T_1\cdot V_1)/2T_2 \ (\%)$$

(2) Measurement of Friction Coefficient

A plurality of clutch plates of SPCC were produced. The clutch plates and the examples 1 to 7 of the clutch disks were incorporated into an SAE#2 testing machine. A dynamic friction coefficient $\mu d$, a static friction coefficient $\mu s$ and an apparent friction coefficient $\mu o$ during stoppage were measured for the friction layer 4 of each of the examples 1 to 7. In this case, the number of clutch disks used was set at 3 and therefore, the number of clutch plates used was set at 4. The conditions for measurement of $\mu d$ and $\mu o$ was established in the following manner: The differential rotational number was set at 3,000 rpm; the inertia was set at 1.24 kgfcms²; and the surface pressure was set at 10 kgf/cm². The value of $\mu s$ was defined to be the maximum $\mu$ value during a low-speed dragging at a differential rotational number of 0.7 rpm.

A ratio $\mu o/\mu d$ of $\mu o$ to $\mu d$ was determined as an indicator for the friction characteristic. In this case, if $\mu o/\mu d \leq 1$, it is determined that the friction layer 4 has a good friction characteristic.

(3) Durability Test

The examples 1 to 7 of the clutch disks 1 and the clutch plates were incorporated into an inertial absorbing-type full-size testing machine, where the friction layers 4 of the examples 1 to 7 were subjected to the durability test. In this case, the numbers of clutch disks and plates used were set at the same values as described above. Test conditions were such that the differential rotational number was set at 3,000 rpm; the inertia was set at 1.8 kgfcms²; and the surface pressure was set at 15 kgf/cm².

After the durability test, the $\mu d$, $\mu s$, $\mu o$ and $\mu o/\mu d$ were determined for the friction layers 4 of the examples 1 to 7, and the wear amount was measured. The wear amount is a decrement in thickness of the friction layer 4.

(4) Table 2 shows results of the various measurements. The porosity $V_1$ of the disk body 2 in each of the examples 1 to 7 of the clutch disks 1 was equal to 10%.

TABLE 2

| Example | Friction layer 4 | | | | | | |
|---|---|---|---|---|---|---|---|
| | 1 | 2 | 3 | 4 | 5 | 6 | 7 |
| Porosity $V_2$ (%) | 15 | 20 | 30 | 40 | 50 | 60 | 65 |
| Before durability test | | | | | | | |
| $\mu d$ | 0.115 | 0.13 | 0.14 | 0.145 | 0.15 | 0.16 | 0.165 |
| $\mu s$ | 0.13 | 0.135 | 0.135 | 0.14 | 0.145 | 0.14 | 0.135 |
| $\mu o/\mu d$ | 1.1 | 0.95 | 0.90 | 0.90 | 0.85 | 0.85 | 0.85 |
| After durability test | | | | | | | |
| $\mu d$ | 0.095 | 0.12 | 0.125 | 0.13 | 0.145 | 0.14 | 0.14 |
| $\mu s$ | 0.14 | 0.14 | 0.145 | 0.14 | 0.145 | 0.14 | 0.135 |
| $\mu o/\mu d$ | 1.18 | 0.99 | 0.98 | 0.98 | 0.95 | 0.95 | 0.92 |
| Wear amount (µm) | 52 | 36 | 26 | 34 | 45 | 55 | 100 |

As is apparent from Table 2, if the porosity $V_2$ of the friction layer 4 is set in a range of $20\% \leq V_2 \leq 60\%$ as in the examples 2 to 6, a good dynamic friction characteristic can be provided, and the durability can be enhanced. If $V_2 < 20\%$ as in the example 1, the dynamic friction characteristic is reduced. On the other hand, if $V_2 > 60\%$ as in the example 7, the wear amount is larger, and the durability is lower.

II. Porosity of Disk Body

New examples 1 to 8 having the compositions shown in Table 3 (that differ from examples 1–7 above) were produced as a preformed yarn to be used in the first forming material for disk body 2. The diameter of the preformed yarns was set at 3 mm. The forming procedures used for the examples shown in Table 3 were similar to those used in the above-described preformed yarn.

TABLE 3

| Preformed yarn | Forming constitute (% by weight) | | | |
|---|---|---|---|---|
| | Pitch powder | Carbon fiber bundle | Coke powder | Sleeve |
| Example 1 | 27 | 50 | 21 | 2 |
| Example 2 | 30 | 48 | 20 | 2 |
| Example 3 | 34 | 45 | 18 | 3 |
| Example 4 | 36 | 45 | 16 | 3 |
| Example 5 | 39 | 43 | 15 | 3 |
| Example 6 | 41 | 41 | 14 | 4 |
| Example 7 | 43 | 40 | 13 | 4 |
| Example 8 | 50 | 38 | 7 | 5 |

Examples 1 to 8 of preformed sheets were made in a weaving manner using the examples 1 to 8 of the preformed yarns as a warp and the nylon 6 fiber yarn having a diameter of 0.05 mm as a weft. The preformed sheet was comprised of 98% by weight of the preformed yarn and 2% by weight of the nylon 6 fiber yarn. The example 4 shown in Table 1 was selected as the second forming material for friction layers 4.

Using the examples 1 to 8 of the preformed sheets which were the first forming materials and the example 4 of the second forming material, examples 1 to 8 of clutch disks 1 made of the C/C composite and similar to those described above were produced. In these examples 1 to 8, the porosity $V_2$ of each friction layer 4 is equal to 30%, but the porosity $V_1$ is varied in the disk bodies 2.

In the examples 1 to 8 of the clutch disks 1, the porosity $V_1$ of the disk body 2 was determined, and the interlayer shear strength was measured for test pieces made from the examples 1 to 8.

Table 4 shows the relationship between the porosity $V_1$ of the disk body 2 and the interlayer shear strength in the examples 1 to 8 of the clutch disks 1.

TABLE 4

| Clutch disk | Porosity $V_1$ (%) of disk body | Interlayer shear strength (kgf/mm$^2$) |
|---|---|---|
| Example 1 | 5 | 1.27 |
| Example 2 | 10.1 | 1.45 |
| Example 3 | 15.8 | 1.03 |
| Example 4 | 19.5 | 1.13 |
| Example 5 | 28.5 | 0.41 |
| Example 6 | 30.5 | 0.41 |
| Example 7 | 33.5 | 0.39 |
| Example 8 | 49 | 0.07 |

Figure 3:
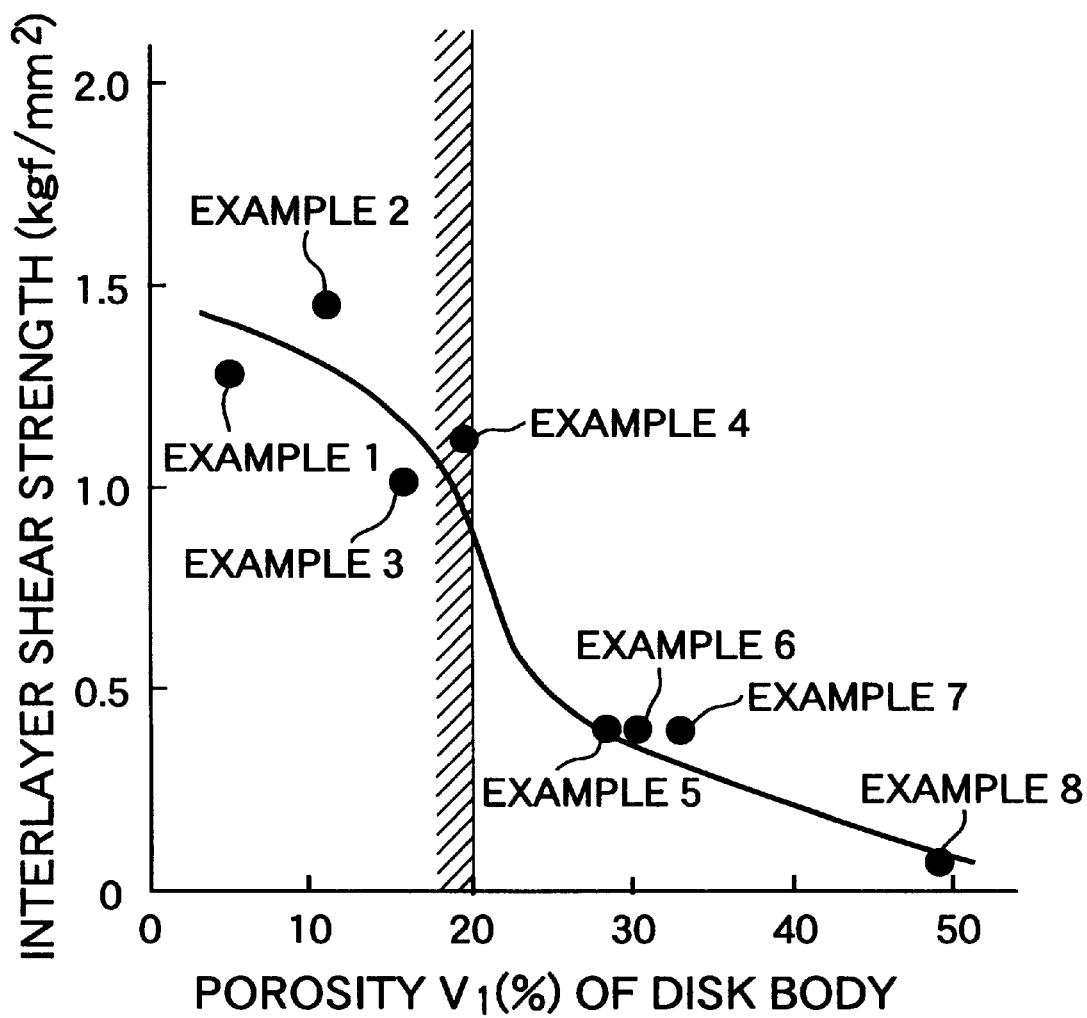
FIG. 3 is a graph illustrating the relationship between the porosity $V_1$ of a clutch disk body and the interlayer shear strength.

FIG. 3 is a graph taken from Table 4. As is apparent from FIG. 3, if the porosity $V_1$ of the disk body 2 is set in a range of $V_1<20\%$, the strength of the disk body 2 can be enhanced. However, a disk body 2 having a porosity $V_1$ lower than 3% is difficult to produce, as described above.

According to the present invention, it is possible to provide a clutch disk made of a C/C composite for a wet friction clutch, which includes a friction layer having an excellent sliding characteristic and has sufficient strength by configuring the clutch disk as described above.

In addition, according to the present invention, it is possible to provide a producing process capable of mass-producing a clutch disk of the above-described type.

What is claimed:

1. A clutch disk of a C/C composite for a wet friction clutch, comprising a disk body, and a friction layer integral with said disk body for sliding contact with a clutch plate, said disk body and friction layer having a relationship of $V_2>V_1$ between a porosity $V_1$ of said disk body and a porosity $V_2$ of said friction layer, said porosity $V_2$ of said friction layer being in a range of $20\% \leq V_2 \leq 60\%$.

2. A clutch disk made of a C/C composite for use in a wet friction clutch according to claim 1, wherein said porosity $V_1$ of said disk body is in a range of $3\% \leq V_1 < 20\%$.

3. A process for producing a clutch disk of a C/C composite for a wet friction clutch, comprising a disk body, and a friction layer integral with said disk body for sliding contact with a clutch plate, said process comprising the steps of forming a preform using a first forming material for the disk body, said material including a group of carbon fibers and a powdery carbon precursor, forming an intermediate including a portion corresponding to said disk body and a portion corresponding to said friction layer using said preform and a second forming material for the frictional layer, said second forming material including a group of carbon fibers and a powdery carbon precursor, and carbonizing said carbon precursor in said intermediate, wherein said preform is a preformed sheet formed by weaving a preformed yarn and a synthetic resin fiber yarn, using one as a warp and the other as a weft.

4. A process according to claim 3, wherein said preform yarn has a diameter of at least five times the diameter of said synthetic resin fiber yarn.

5. A process according to claim 3, wherein said preformed yarn forms about 98% by weight of said preformed sheet.

6. A process for producing a clutch disk of a C/C composite for a wet friction clutch, comprising a disk body, and a friction layer integral with said disk body for sliding contact with a clutch plate, said process comprising the steps of forming a preform using a first forming material for the disk body, said material including a group of carbon fibers and a powdery carbon precursor, forming an intermediate including a portion corresponding to said disk body and a portion corresponding to said friction layer using said preform and a second forming material for the frictional layer, said second forming material including a group of carbon fibers and a powdery carbon precursor, and carbonizing said carbon precursor in said intermediate, wherein said disk body in said clutch plate has a porosity $V_1$, said friction layer in said clutch plate has a porosity $V_2$, said porosities are related by $V_2>V_1$, and said porosity $V_2$ of said friction layer is in a range of about $20\% \leq V_2 \leq 60\%$.

7. A process according to claim 6, wherein said porosity $V_1$ of said disk body is in a range of about $3\% \leq V_1 < 20\%$.

8. A process for producing a clutch disk of a C/C composite for a wet friction clutch, comprising the steps of forming a disk body, forming a friction layer integral with said disk body for sliding contact with a clutch plate, and establishing, by selecting different materials for said disk body and friction layer, a relationship of $V_2>V_1$ between a porosity $V_1$ of said disk body and a porosity $V_2$ of said friction layer, and said porosity $V_2$ of said friction layer being in a range of $20\% \leq V_2 \leq 60\%$.

9. A process according to claim 8, wherein said porosity $V_1$ of said disk body is in a range of $3\% \leq V_1 < 20\%$.

10. A clutch disk according to claim 1, wherein said disk body is comprised of a woven sheet.

11. A clutch disk according to claim 11, wherein said woven sheet is formed of a preformed yarn and a synthetic resin fiber, with one used as a warp and the other used as a weft.

12. A clutch disk according to claim 11, wherein said preformed yarn has a diameter of at least five times the diameter of said synthetic resin fiber yarn.

13. A clutch disk according to claim 11, wherein said preformed yarn forms about 98% by weight of said preformed sheet.

14. A clutch disk according to claim 1, wherein said friction layer includes a mixture of random fibers and a powdery carbon precursor.

15. A clutch disk according to claim 11, wherein said friction layer includesf a mixture of random fibers and a powdery carbon precursor.

* * * * *